United States Patent [19]

Pradovic

[11] Patent Number: 4,880,342
[45] Date of Patent: Nov. 14, 1989

[54] MOVABLE BULKHEAD

[75] Inventor: Joseph A. Pradovic, LaCrosse, Wis.

[73] Assignee: Millis Transfer, Inc., Black River Falls, Wis.

[21] Appl. No.: 207,397

[22] Filed: Jun. 16, 1988

[51] Int. Cl.$^4$ ............................................. B06P 7/14
[52] U.S. Cl. .................................. 410/121; 410/127; 410/132; 410/135; 410/141
[58] Field of Search .................. 410/53, 54, 121, 127, 410/129, 130, 132, 135, 140–142; 62/328; 105/411

[56] References Cited

U.S. PATENT DOCUMENTS

| | | |
|---|---|---|
| Re. 22,272 | 2/1943 | Lundvall. |
| 982,024 | 1/1911 | Swartz ............................... 410/141 |
| 2,071,802 | 2/1937 | Sweeley et al. ..................... 410/132 |
| 2,331,197 | 10/1943 | Johnston ............................. 410/130 |
| 2,333,949 | 11/1943 | O'Connor ............................ 62/328 |
| 2,989,011 | 6/1961 | Henrikson ........................... 410/140 |
| 3,559,591 | 2/1971 | Breen ................................... 410/127 |
| 3,590,746 | 7/1971 | Gibson ................................ 410/127 |
| 4,498,824 | 2/1985 | Kinkle ................................. 410/121 |

FOREIGN PATENT DOCUMENTS 135,751 12/1919 United Kingdom ................. 410/129

Primary Examiner—Dennis H. Pedder
Assistant Examiner—Dean J. Kramer
Attorney, Agent, or Firm—Andrews, Sceales, Starke & Sawall

[57] ABSTRACT

A movable bulkhead for a cargo carrying container includes a fixed panel and one or move movable panels. The movable panels are movable between a first position in which they are coplanar with the fixed panel so as to define a maximum cargo volume within the container, and a second position in which the movable panels are spaced from the fixed panel to thereby reduce the cargo volume within the container. Load bars are adapted for engagement with the side walls of the container for bracing the movable panels against movement when such panels are in their second position, and are adapted for storage behind the movable panels when such panels are in their first position and the load bars are not in use.

14 Claims, 2 Drawing Sheets

MOVABLE BULKHEAD

BACKGROUND AND SUMMARY

This invention relates to a cargo carrying container for a vehicle, and more particularly to a bulkhead construction for such a container.

In a cargo carrying container, such as a semitrailer adapted to be pulled behind a tractor, it is often the case that the load carried in the container does not occupy the entire volume of the container. With this situation, it is necessary to brace the load so that it does not shift during transport.

A number of U.S. patents are directed to a structure for bracing a load against movement at a location other than that of the permanent bulkhead of the container. A representative structure for accomplishing this objective is disclosed in U.S. Pat. No. 2,071,802 to Sweeley et al. This patent discloses a movable wall section which is mounted at its ends to a rail provided on the side walls of the container. The side walls are provided with a plurality of spaced slots, and the movable wall has one or more bolts engageable with the slots to fix the movable wall in a selected location. A drawback to this construction is that, when the movable wall is moved to a position adjacent a stationary wall at an end of the container to define a maximum interior volume, the movable wall necessarily takes up a certain amount of space. Such space is then unavailable for accommodating the load placed within the container.

The present invention is designed to provide a more efficient movable bulkhead structure for a cargo carrying container. In accordance with the invention, a cargo compartment for a vehicle includes a bottom wall and a pair of spaced side walls extending upwardly from the bottom wall. An end wall, which may or may not be stationary and may be defined by the doors of the container, extends between the side walls. An upstanding bulkhead wall is spaced from the end wall and extends between the side walls. The bulkhead wall includes a fixed, stationary panel which forms a portion of the permanent bulkhead. At least one movable panel forms the remainder of the bulkhead wall when in a first position in which the movable panel is coplanar with the stationary panel, to thereby define a maximum cargo volume within the compartment. The movable panel is movable to a second position in which it is spaced from the stationary panel of the bulkhead wall and toward the end wall. When the movable bulkhead panel is in its second position, a cargo volume less than the maximum cargo volume is defined. A bracing means is provided for bracing the movable bulkhead panel against movement when the movable panel is in its second position. The bracing means is adapted for storage behind the movable panel when the movable panel is in its first position and the bracing means is not in use. In this manner, the bracing means occupies no space within the interior of the cargo compartment. In one embodiment, the bracing means comprises one or more load bars which extend between the side walls of the compartment and are engageable therewith. The movable bulkhead panel is mountable to the load bars for bracing the movable panel against movement when the movable panel is in its second position. The load bars can be stored behind the movable panel when the movable panel is in its first position to form part of the permanent bulkhead.

The invention further contemplates an apparatus for providing a movable bulkhead, generally in accordance with the above summary. A method of providing a movable bulkhead is also disclosed, generally in accordance with the above summary.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
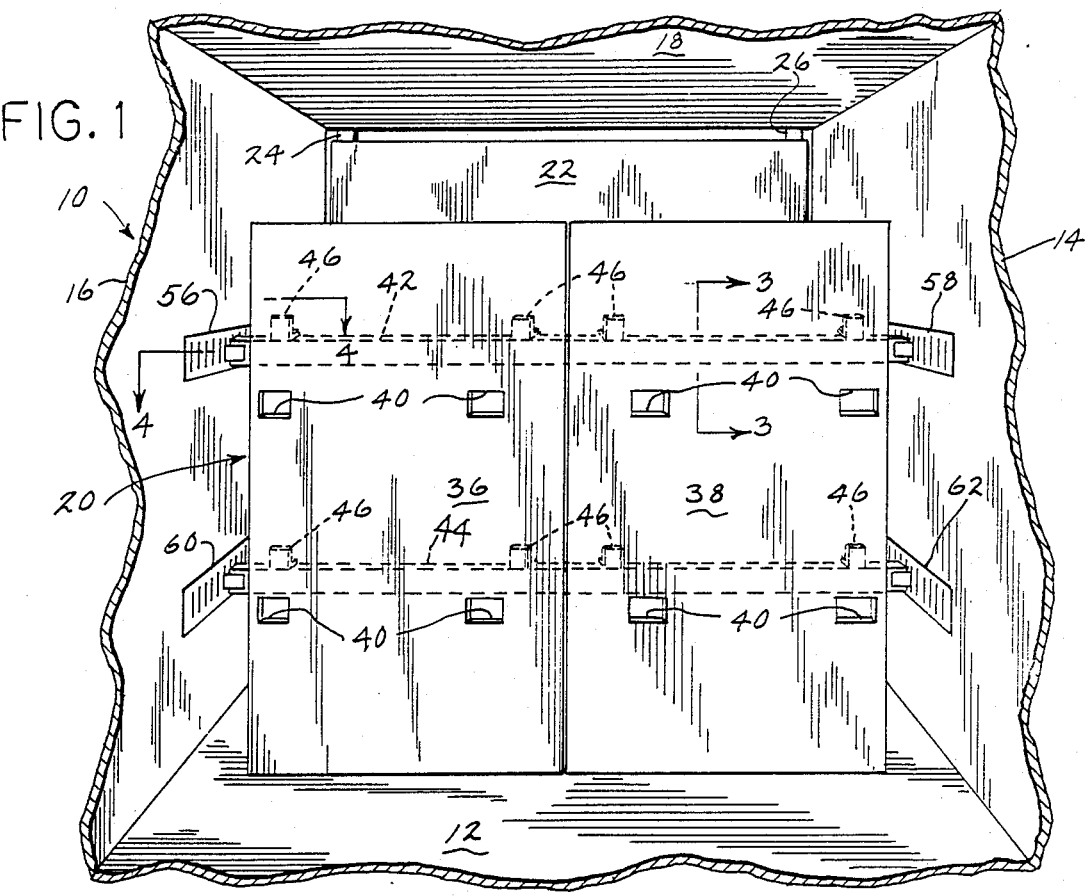
FIG. 1 is a perspective view of the interior of a cargo compartment incorporating the movable bulkhead of the invention, showing a pair of movable bulkhead panels in a position in which they are spaced from a stationary bulkhead panel.

As shown in FIG. 1, a cargo container 10 generally includes a floor 12 having a pair of upstanding side walls 14, 16 connected thereto and extending upwardly therefrom. A ceiling 18 extends between side walls 14, 16.

A bulkhead, shown generally at 20, is provided at an end of container 10. An upstanding end wall (not shown) is spaced from bulkhead 20 at the other end of container 10. The upstanding end wall may be fully or partially formed by the doors of container 10, which are movable between an open position for loading the interior of containter 10 and a closed position for retaining the load therein.

Bulkhead 20 includes a fixed, stationary bulkhead panel 22 extending between side walls 14, 16 and secured to corner posts 24, 26 of container 10. Fixed panel 22 is also secured to one or more of series of container nose posts, shown at 28, 30, 32 and 34 (FIG. 2).

Figure 2:
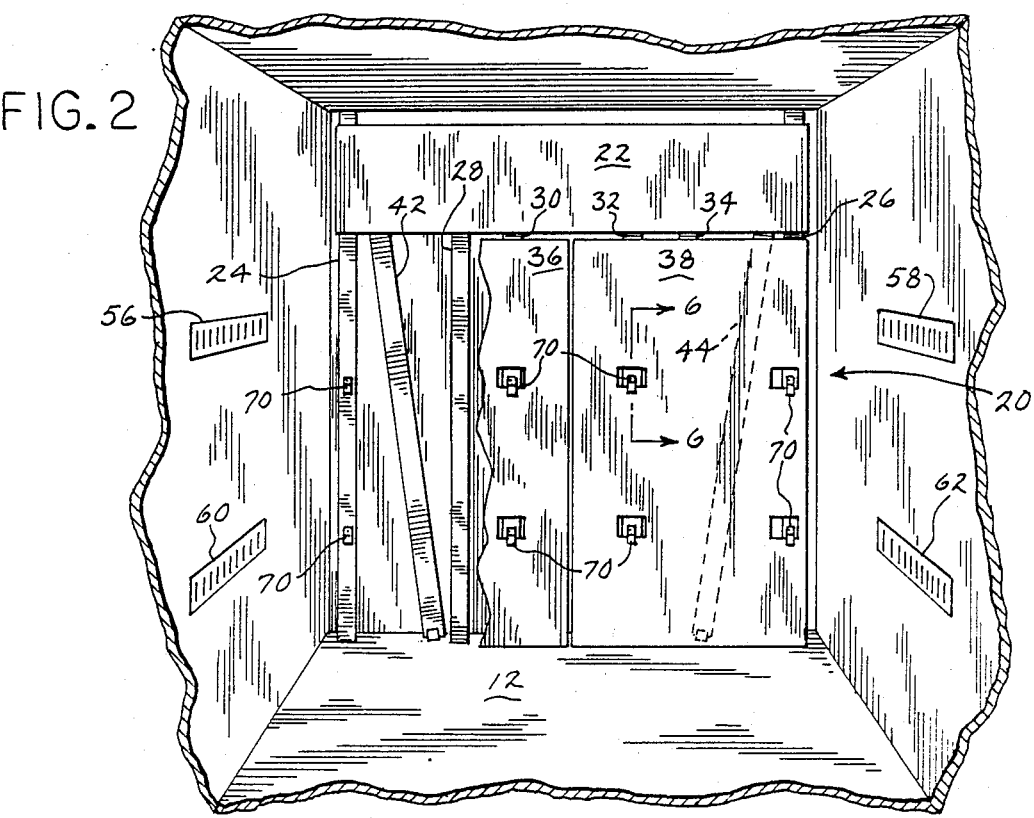
FIG. 2 is a view similar to FIG. 1, showing the movable bulkhead panels as they form a part of the permanent bulkhead, with the load bars stored behind the movable panels.

As can be seen in FIGS. 1 and 2, fixed bulkhead panel 22 occupies less than the full height of bulkhead 20. The remainder of the height of bulkhead 20 is occupied by a pair of side by side movable bulkhead panels 36, 38. Panels 36, 38 are movable between a first position (FIG. 2), in which they form a part of the permanent bulkhead of container 10, and one or more second positions in which panels 36, 38 are spaced from fixed panel 22 (FIG. 1). When in their first position (FIG. 2), panels 36, 38 are substantially coplanar with fixed panel 22 to define a maximum cargo volume within container 10. When in their second position (FIG. 1), panels 36, 38 define a cargo volume less than the maximum cargo volume.

Panels 36, 38 are each provided with a series of openings 40 which facilitate handling of the panels.

Upper and lower load bars 42, 44 are provided as a bracing means for bracing panels 36, 38 against movement when such panels are in their second position spaced from fixed panel 22. Load bars 42, 44 extend between side walls 14, 16 of container 10. The ends of load bars 42, 44 are adapted for connection to side walls 14, 16 at a plurality of locations, as will be explained, for securing movable panels 36, 38 at a plurality of positions spaced from fixed panel 22.

Figure 3:
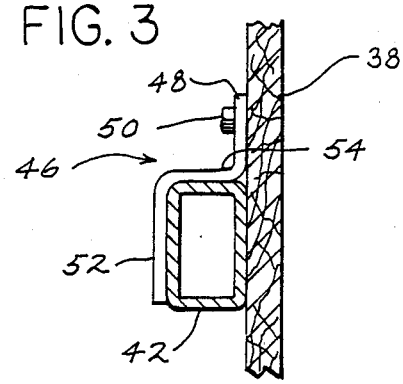
FIG. 3 is a partial sectional view taken generally along line 3—3 of FIG. 1.

A series of Z-brackets 46 are connected to the rear face of each of movable panels 36, 38 for mounting panels 36, 38 to load bars 42, 44. As shown in FIG. 3, Z-brackets 46 include an upper leg 48 adapted for connection to panel 38 by means of a screw 50 or other satisfactory connector. Z-brackets 46 are adapted to be moved downwardly onto and over the top of load bars 42, 44 so as to engage load bars 42, 44 with a lower leg 52 and a shoulder 54 provided on Z-bracket 46. With the construction shown in FIG. 3, panels 36, 38 are securely mountable to load bars 42, 44.

Figure 4:
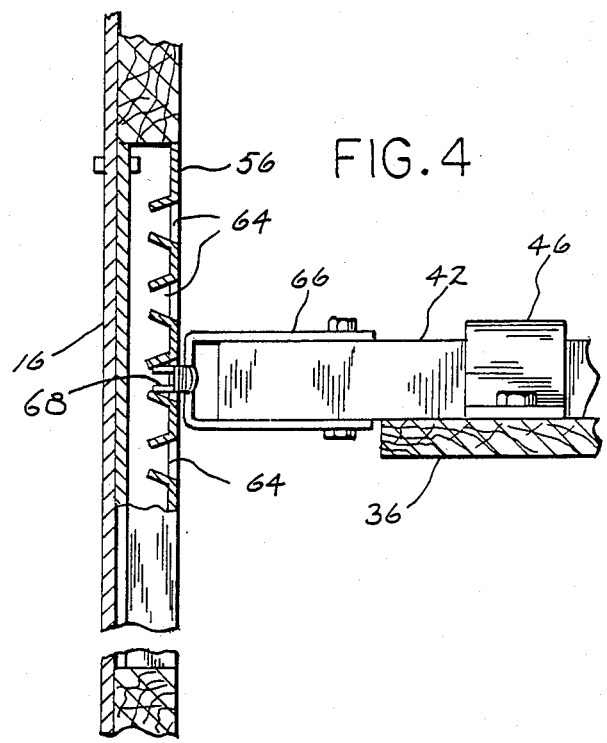
FIG. 4 is a partial sectional view taken generally along line 4—4 of FIG. 1.

The leftward end of load bar 42 is engageable with a recessed E-track 56 mounted to container side wall 16, and the rightward end of load bar 42 is likewise engageable with a recessed E-track 58 mounted to container side wall 14. In a like manner, the leftward end of lower load bar 44 is engageable with a recessed track 60, and the rightward end of load bar 44 is engageable with an E-track 62. Such connection of the ends of load bars 42, 44 to the E-tracks is representatively shown in FIG. 4. As seen therein, E-track 56 includes a series of spaced vertical slots 64 along its length. The end of load bar 42 is provided with an end bracket 66 which includes a projecting portion 68. Projecting portion 68 is engageable with one of slots 64 at a selected location along the length of E-track 56. In this manner, load bar 42 may be selectively positioned a desired distance from fixed bulkhead panel 22, and movable panel 36 mounted thereto to reduce the cargo volume of container 10. With the construction shown in FIG. 4, load bars 42, 44 are securely connected to side walls 14, 16 of container 10 so as to prevent their movement after engagement.

With reference to FIG. 2, load bars 42, 44 are adapted for storage behind movable panels 36, 38 when panels 36, 38 form a part of the permanent bulkhead of container 10. In this manner, the load bars are always stored in a secure location and are readily available when it is desired to reduce the cargo volume of container 10.

Figure 5:
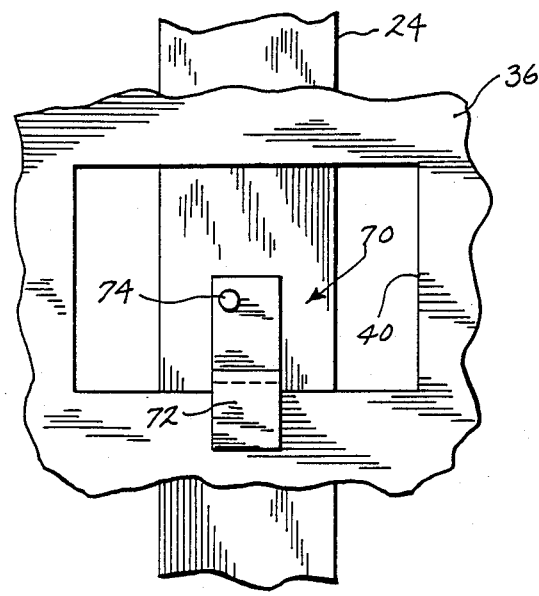
FIG. 5 is an enlarged front elevation view showing a mechanism for retaining the movable bulkhead panels when they form a part of the permanent bulkhead.
Figure 6:
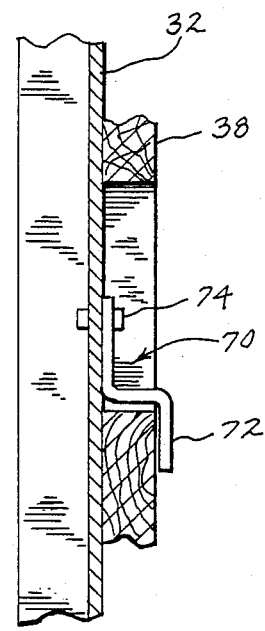
FIG. 6 is a sectional view taken generally along line 6—6 of FIG. 2.

A series of latches 70 are provided for retaining movable bulkhead panels 36, 38 in their first position when panels 36, 38 are coplanar with fixed panel 22. As shown in FIG. 2, a pair of latches 70 are mounted to each of corner posts 24, 26 and nose posts 30, 32. Latches 70 are movable between an engaging position, as shown in FIG. 5 wherein a lower leg 72 engages panel 36 adjacent opening 40, and a disengaging position in which latch 70 is pivoted 90° out of engagement with panel 36. When latch 70 is in its engaging position, lower leg 72 acts to firmly secure panel 36 to post 24 so as to prevent its movement. When latch 70 is moved to its disengaging position, panel 36 is movable out of engagement with post 24. Each latch 70 is secured to its respective post by means of a bolt 74 or other satisfactory fastener which allows pivoting movement of latch 70 between its engaging and disengaging positions.

In accordance with the above-described construction, a movable bulkhead is provided which efficiently and economically allows the cargo volume of a container to be reduced from the maximum volume.

Also in accordance with the invention, a method of varying the cargo volume of a cargo container includes a series of steps generally in accordance with the above-described structure. Bulkhead 20 of container 10 is provided with fixed panel 22 forming a portion of its height and a pair of movable panels 36, 38 forming the remainder of its height. The bracing means, such as load bars 42, 44, are provided for bracing movable panels 36, 38 against movement when such panels are spaced from fixed panel 22. As described, load bars 42, 44 are adapted to be stored behind panels 36, 38 when such panels are coplanar with fixed panel 22 and load bars 42, 44 are not in use.

Various alternatives and modifications are contemplated as being within the scope of the following claims particularly pointing out and distinctly claiming the invention.

I claim:

1. A cargo compartment for a vehicle, comprising:
   a bottom wall;
   a pair of spaced side walls extending upwardly from spaced sides of said bottom wall;
   an upstanding bulkhead wall extending between said side walls, said bulkhead wall including a stationary panel and at least one movable panel which is movable between a first position wherein said movable panel is substantially coplanar with said stationary panel to define a maximum cargo volume within said cargo compartment, and a second position spaced from said bulkhead wall to define a cargo volume less than said maximum cargo volume; and
   bracing means for bracing said movable bulkhead panel against movement when said movable panel is in its second position, said bracing means extending between and connectable to said spaced side walls of said compartment for bracing said movable bulkhead panel against movement, said bracing means being adapted for storage behind said movable panel when said movable panel is in its first position and said bracing means is not in use.

2. A cargo compartment for a vehicle, comprising:
   a bottom wall;
   a pair of spaced side walls extending upwardly from spaced sides of said bottom wall;
   an upstanding bulkhead wall extending between said side walls, said bulkhead wall including a stationary panel and at least one movable panel which is movable between a first position wherein said movable panel is substantially coplanar with said stationary panel to define a maximum cargo volume within said cargo compartment, and a second position spaced from said bulkhead wall to define a cargo volume less than said maximum cargo volume, said movable bulkhead panel being movable to a plurality of positions for varying the space between said movable bulkhead panel and said stationary bulkhead panel to provide varying cargo volumes of said cargo compartment less than said maximum cargo volume; and
   bracing means for bracing said movable bulkhead panel against movement when said movable panel is in a position other than said first position, said bracing means being adapted for storage behind said movable panel when said movable panel is in its first position and said bracing means is not in use, said bracing means comprising one or more load bars to which said movable panel is mountable, said one or more load bars being adapted to extend between spaced surfaces of said cargo compartment, each said spaced surface being provided with engagement means for engaging an end of a load bar at a plurality of locations spaced from said stationary bulkhead panel.

3. The cargo compartment of claim 2, wherein each end of said one or more load bars is provided with a projection, and wherein said engagement means includes a plurality of slots spaced progressively from said stationary bulkhead panel, each slot being adapted to receive and engage the projection at an end of one of said load bars.

4. In a cargo container including a bottom wall, a pair of spaced side walls extending upwardly from spaced sides of said bottom wall, and a bulkhead wall extending upwardly from said bottom wall, said bulkhead wall including a stationary fixed panel, the improvement comprising a movable panel associated with said bulkhead wall and disposed adjacent said stationary fixed panel, said movable panel being movable between a first position wherein said movable panel is substantially coplanar with said fixed panel to define a maximum cargo volume in said container, and a second position wherein said movable panel is spaced from said fixed panel of said bulkhead wall to define a cargo volume less than said maximum cargo volume, wherein said stationary fixed panel extends less than the full height of said bulkhead wall, and wherein said movable bulkhead panel extends the remainder of the height of said bulkhead wall, and further comprising bracing means for bracing said movable bulkhead panel against movement when said movable panel is in its second position, said bracing means being adapted for storage behind said movable panel when said movable panel is in its first position and said bracing means is not in use.

5. In a cargo container including a bottom wall, a pair of spaced side walls extending upwardly from spaced sides of said bottom wall, and a bulkhead wall extending upwardly from said bottom wall, said bulkhead wall including a stationary fixed panel, the improvement comprising a movable panel associated with said bulkhead wall and disposed adjacent said stationary fixed panel, said movable panel being movable between a first position wherein said movable panel is substantially coplanar with said fixed panel to define a maximum cargo volume in said container, and a second position wherein said movable panel is spaced from said fixed panel of said bulkhead wall to define a cargo volume less than said maximum cargo volume, wherein said movble bulkhead panel is movable to a plurality of positions for varying the space between said movable panel and said stationary fixed panel to provide varying cargo volumes for said cargo container less than said maximum cargo volume.

6. The improvement of claim 5, further comprising bracing means for bracing said movable bulkhead panel against movement at each of said plurality of positions to which said movable bulkhead panel is movable, said bracing means being adapted for storage behind said movable bulkhead panel when said movable panel is in its first position and said bracing means is not in use.

7. An apparatus for providing a movable bulkhead for a cargo container, said container including a floor, a pair of spaced side walls extending upwardly from said floor, and an upstanding bulkhead wall extending between said side walls, said bulkhead wall including a fixed panel extending between said side walls less than the full height of said bulkhead wall, said apparatus comprising:
at least one movable bulkhead panel, said movable bulkhead panel being movable between a first position in which said movable panel is substantially coplanar with said fixed bulkhead panel to define a maximum cargo volume, and a second position in which said movable panel is spaced from said fixed panel to define a cargo volume less than said maximum volume; and
bracing means for maintaining said movable bulkhead panel in said one or more second positions, said bracing means being adapted for storage behind said movable bulkhead panel when said movable panel is in its first position and said bracing means is not in use.

8. The apparatus of claim 7, wherein said movable bulkhead panel extends substantially the entire distance between said side walls of said cargo container.

9. The apparatus of claim 8, wherein said movable bulkhead panel is movable to a plurality of second positions in which said movable bulkhead panel is spaced from said fixed panel, and wherein said bracing means is adapted to accommodate such movement of said movable panel and to brace said movable panel against movement at each of said second positions.

10. The apparatus of claim 9, wherein said bracing means comprises one or more load bars to which said movable panel is mountable, said one or more load bars extending between spaced interior surfaces of said cargo container, each said interior surface being provided with engagement means for engaging an end of a load bar at a plurality of locations spaced from said fixed panel.

11. The apparatus of claim 10, wherein each end of said one or more load bars is provided with a projection, and wherein said engagement means is provided with a plurality of spaced slots, each of which is adapted to receive and engage a projection at an end of one of said load bars.

12. A method of varying the cargo volume of a cargo container, said container including a floor, a pair of spaced side walls extending upwardly from said floor, and an upstanding bulkhead wall spaced from said end wall and extending between said side walls, comprising the steps of:
providing a fixed panel forming a portion of said bulkhead wall, said fixed panel extending less than the full height of said bulkhead wall;
providing a movable panel forming the remainder of the height of said bulkhead wall, said movable panel being movable between a first position in which said movable panel is substantially coplanar with said fixed bulkhead panel so as to provide a maximum cargo volume within said container, and a second position in which said movable panel is spaced from said fixed panel so as to provide a cargo volume less than said maximum cargo volume;
providing a bracing means for bracing said movable panel against movement when said movable panel is in its second position; and
storing said bracing means behind said movable panel when said movable panel is in its first position and said bracing means is not in use.

13. The method of claim 12, wherein said step of providing said movable panel comprises providing a panel which is movable to a plurality of second positions in which said movable panel is spaced from said fixed panel.

14. The method of claim 13, wherein said step of providing a bracing means comprises providing one or more load bars spanning between and connectable to spaced interior surfaces of said container, said movable panel being mountable to said one or more load bars, and further comprising the step of providing engagement means on said spaced interior surfaces of said container for engaging said one or more load bars and allowing movement of said one or more load bars to a plurality of positions to accommodate placement of said movable panel at said plurality of second positions.

* * * * *